US009319455B2

(12) United States Patent
McCoy et al.

(10) Patent No.: US 9,319,455 B2
(45) Date of Patent: Apr. 19, 2016

(54) METHOD AND SYSTEM FOR SEAMLESS NAVIGATION OF CONTENT ACROSS DIFFERENT DEVICES

(71) Applicants: SONY CORPORATION, Tokyo (JP); SONY NETWORK ENTERTAINMENT INTERNATIONAL LLC, Los Angeles, CA (US)

(72) Inventors: Charles McCoy, Coronado, CA (US); True Xiong, San Diego, CA (US); Ling Jun Wong, Champaign, IL (US)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 13/786,766

(22) Filed: Mar. 6, 2013

(65) Prior Publication Data
US 2014/0258445 A1 Sep. 11, 2014

(51) Int. Cl.
*G06F 15/16* (2006.01)
*H04L 29/08* (2006.01)
*G06Q 10/10* (2012.01)
*G06Q 30/02* (2012.01)

(52) U.S. Cl.
CPC .............. *H04L 67/10* (2013.01); *G06Q 10/101* (2013.01); *G06Q 30/0269* (2013.01); *H04L 67/2823* (2013.01)

(58) Field of Classification Search
CPC .................................................. H04L 67/2823
USPC .................................................. 709/216, 217
See application file for complete search history.

(56) References Cited

U.S. PATENT DOCUMENTS

| 5,721,829 | A | 2/1998 | Dunn et al. |
| 6,363,204 | B1 | 3/2002 | Johnson et al. |
| 7,437,751 | B2 | 10/2008 | Daniels |
| 2002/0032728 | A1* | 3/2002 | Sako et al. ............. 709/203 |

(Continued)

FOREIGN PATENT DOCUMENTS

| EP | 1071287 A | 1/2001 |
| EP | 2453665 A1 | 5/2012 |

(Continued)

OTHER PUBLICATIONS

Extended European Search Report issued on Jul. 24, 2014 in patent application No. 14157688.4.

(Continued)

*Primary Examiner* — Adnan Mirza
(74) *Attorney, Agent, or Firm* — Sony Corporation

(57) ABSTRACT

Certain aspects of a system and method for seamless navigation of content between different devices may include one or more devices communicably coupled to one or more servers through a communication network. The devices are capable of rendering content. The device generates the status information corresponding to the first content and communicates the status information to a server when the device navigates from the first content and/or to a second content. The device can render the second content based on a metadata associated with the second content received from the server. The server generates a metadata associated the first content based on the status information received from the device. The server saves the metadata associated with the first content. The server communicates the metadata associated with the first content to a device when the first content has to be rendered in the device.

42 Claims, 11 Drawing Sheets

(56) References Cited

U.S. PATENT DOCUMENTS

| | | |
|---|---|---|
| 2002/0059610 A1 | 5/2002 | Ellis |
| 2005/0171938 A1 | 8/2005 | Fisher et al. |
| 2006/0277375 A1* | 12/2006 | Takeuchi ............ 711/154 |
| 2008/0016544 A1 | 1/2008 | Lee et al. |
| 2008/0168521 A1 | 7/2008 | Hsu et al. |
| 2010/0129050 A1 | 5/2010 | Alexander et al. |
| 2012/0301854 A1 | 11/2012 | Vann, Jr. |

FOREIGN PATENT DOCUMENTS

| | | |
|---|---|---|
| KR | 10-2010-0002536 A | 1/2010 |
| WO | WO2006015186 A | 2/2006 |
| WO | WO2006123292 A | 11/2006 |
| WO | 2009/064516 A1 | 5/2009 |

OTHER PUBLICATIONS

Korean Office Action issued on Feb. 9, 2015 in patent application No. 10-2014-25366.

* cited by examiner

|  | DEVICES | | | |
|---|---|---|---|---|
| SERVICES | Mobile Phone | Tablet | Laptop | Television |
| Audio Content | Spec 1 | Spec 2 | Spec 3 | Spec 4 |
| Video Content | Spec 5 | Spec 6 | Spec 7 | Spec 8 |
| Web Browsing | Spec 9 | Spec 10 | Spec 11 | Spec 12 |
| Movie | Spec 13 | Spec 14 | Spec 15 | Spec 16 |

FIG. 6

METHOD AND SYSTEM FOR SEAMLESS NAVIGATION OF CONTENT ACROSS DIFFERENT DEVICES

FIELD

Various embodiments of the disclosure relate to content navigation. More specifically, various embodiments of the disclosure relate to seamless navigation of content across different devices.

BACKGROUND

Devices such as a television, personal computer, laptop, mobile phone, and other portable devices can be used for listening to audio content and watching audio-visual content. These content-rendering devices are advancing at a rapid pace thereby providing enhanced features to users. Concomitant with such advancements is the availability of high speed networks. A user may use the content-rendering devices to access and render content via the communication network. With a multitude of features and content options available on the content rendering devices, the user may want to seamlessly navigate between different devices while a given content is being rendered.

Further limitations and disadvantages of conventional and traditional approaches will become apparent to one of skill in the art, through comparison of such systems with some aspects of the present disclosure as set forth in the remainder of the present application with reference to the drawings.

SUMMARY

A system and method are provided for seamless navigation of content across different devices substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 6 is a table illustrating variations in specification of different services associated with various devices, in accordance with an embodiment of the disclosure.

DETAILED DESCRIPTION

Figure 1:
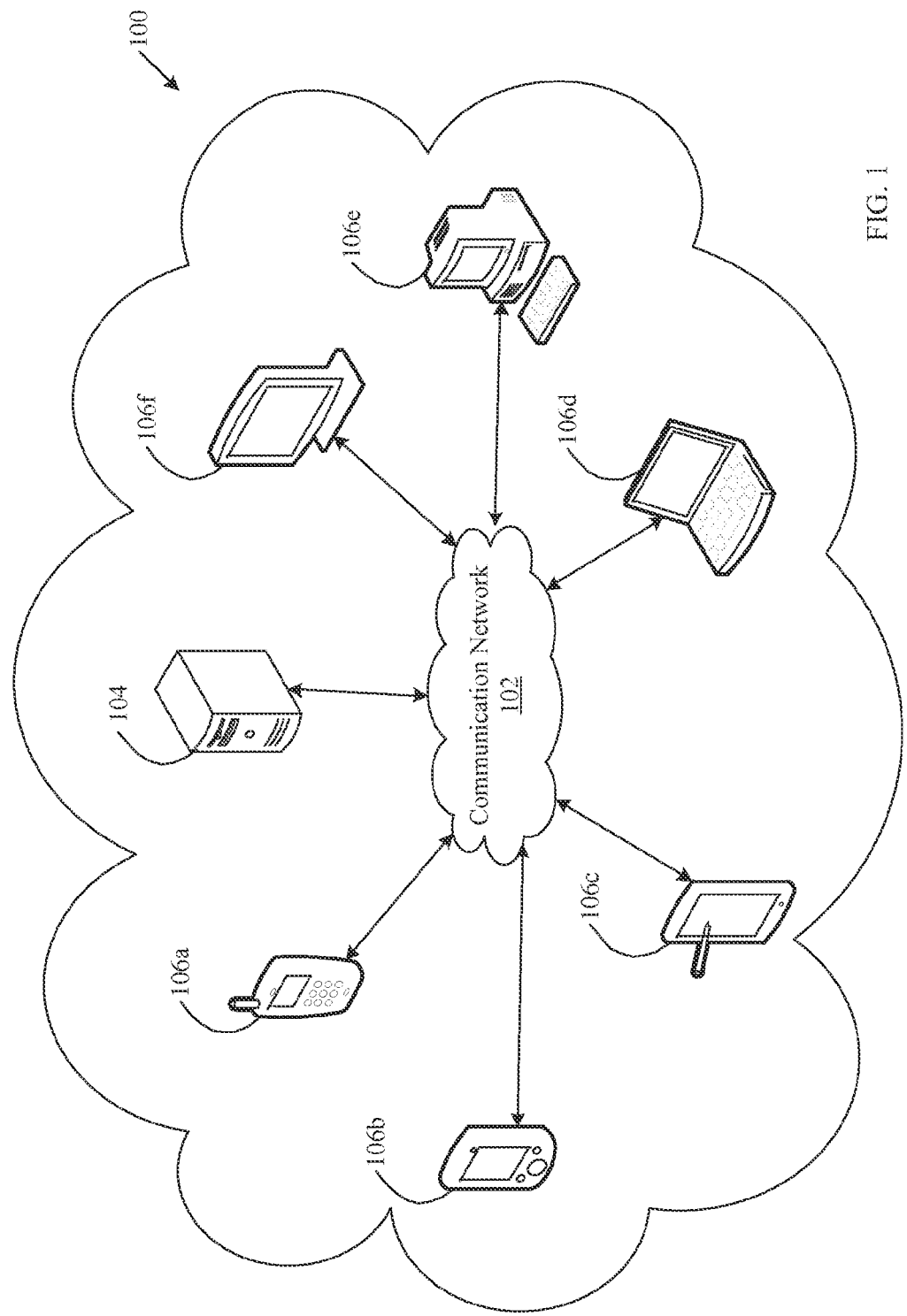
FIG. 1 is a block diagram illustrating a system environment in which the present disclosure may be implemented, in accordance with an embodiment of the disclosure.

Various implementations may be found in a system and/or method for seamless navigation of content across multiple devices. Exemplary aspects of the disclosure may comprise a method for rendering content in a device communicably coupled to a server. The method may include generating status information that corresponds to a first content being rendered when the device navigates from the first content and/or to a second content. The generated status information may be communicated to the server. A second content may be rendered based on metadata associated with status information of the second content. The applicable metadata is received from the server. In an embodiment, the status information corresponding to the first content may be generated when the device receives a request to navigate away from the first content. In an embodiment, the applicable metadata may be received from the server when the device receives a request to navigate to the second content. In an embodiment, the navigation from the first content may be one of navigating to a menu or turning off the device. In another embodiment, the first content may continue to be rendered in a background mode, for example, when navigating to a menu as the second content and the second content may be rendered as an overlay over the first content. In an embodiment, the first content or the second content may be rendered as a picture in picture. In an embodiment, the first content and the second content may be same.

The metadata may comprise a Uniform Resource Locator (URL). The device may receive the first content and the second content from the server. The status information may comprise one or more of pause points, resume points, shared pause points, shared resume points, levels in a game, episodes in a serial, user performed actions, such as rewinding a portion of the first content, re-playing a portion of the first content and the like. The method for rendering content may be associated with one or more user profiles. The one or more user profiles may comprise one or more of users' interest, users' emotion, users' location, and the like. The method for rendering content may comprise rendering a prioritized list of plurality of content based on applicable one or more user profiles. The method may comprise rendering advertisements along with the first content and/or the second content, based on the one or more user profiles. The first content and/or second content may comprise live content, pre-stored content and/or a combination of both live and pre-stored content. The method may render the first content and/or second content in accordance with predefined parameters associated with the device and/or a communication network associated with the device. One or more predefined parameters associated with the device may comprise one or more of one or more file formats that the device is capable of rendering, one or more codecs that the device is capable of rendering, aspect ratio, two-dimensional (2D) display, three-dimensional (3D) display, touch screen display, 3D sensors, and/or number of audio channels supported by the device. One or more predefined parameters for the communication network may comprise one or both of bandwidth, and/or connectivity. The one or more file formats may include file formats for text, audio, image and/or audio-visual content, such as 3GPP file format, Extensible Music Format. The one or more codecs may include codecs for text, audio, image and/or audio-visual content, such as MPEG-4 Scalable to Lossless Coding, MPEG-4 Audio Lossless Coding, H.264 Advanced Video Coding.

Described embodiments of the disclosure may be found in a system and/or method for rendering content in a device. Exemplary aspects of the disclosure may comprise the method in a server communicably coupled to a plurality of devices. Other exemplary aspects of the disclosure may comprise the method in one or more servers and a plurality of devices, where the one or more servers and the plurality of devices are connected to a cloud environment. The method may include generating a metadata associated with a content from status information corresponding to the content, wherein the status information is received from a first device of the plurality of devices when the first device navigates to a second content. In an embodiment, the method may include generating the metadata associated with content based on the received status information corresponding to the content, wherein the status information is received from a first device of the plurality of devices when the first device receives a request to navigate away from the content. The method may include communicating the metadata to a second device of the plurality of devices, wherein the content is rendered in the second device based on the metadata. In an embodiment, the server may communicate the metadata to the second device when the second device receives a request to navigate to the content. The first device and the second device may or may not be same. The method comprises communicating one or more advertisements to the second device, wherein the one or more advertisements are selected based on one or more user profiles.

FIG. 1 is a block diagram illustrating a system environment 100 in which the present disclosure may be implemented, in accordance with an embodiment of the disclosure. In reference to FIG. 1, there is shown one or more servers (such as, a server 104), and devices (106a, 106b, 106ac 106d, 106e, 106f, and the like, hereinafter referred to as 106) for rendering content. The one or more servers (such as, a server 104) and the devices 106 are communicably coupled to a communication network 102.

The communication network 102 corresponds to a medium through which various components of the system environment 100 communicate with each other. Examples of the communication network 102 may include, but are not limited to, a television broadcasting system, an Internet Protocol television (IPTV) network, the Internet, a Wireless Fidelity (Wi-Fi) network, a Wireless Area Network (WAN), a Local Area Network (LAN), a telephone line (POTS), or a Metropolitan Area Network (MAN). Various devices (such as, 106) in the system environment 100 can connect to the communication network 102, in accordance with various wired and wireless communication protocols, such as Transmission Control Protocol and Internet Protocol (TCP/IP), User Datagram Protocol (UDP), 2G, 3G, or 4G communication protocols. Further, communication network 102 may connect to the one or more devices 106 and the one or more servers (such as, 104).

The server 104 may correspond to an electronic device configured to perform a computation, comprising at least one database and at least one processor. The server 104 may store one or more of the plurality of contents accessed by the devices 106. In an embodiment, the server 104 may store the status information which corresponds to each of the plurality of contents associated with each of the devices 106. In an embodiment, the server 104 may have a user profile which corresponds to all the registered users. The user profile may include data which corresponds to the user which may define a user's personal preferences and characteristics. The user profile may also include dynamic data such as the location of the user, a current activity of the user, the devices 106 of user, and the like. In an embodiment, the server 104 may store the status information which corresponds to each of the plurality of contents associated with user profiles registered with the server 104.

The devices 106 may correspond to an electronic device capable of displaying information, such as video and/or audio-visual content. The devices 106 may include a computing device that produces, streams or downloads information to be displayed, and a display screen or a projection surface that displays the information. In an embodiment, the display device includes the display screen and the computing unit integrated as a single unit. In an embodiment, the display device includes the computing device and the display screen as separate units. Examples of display devices include, but are not limited to, laptops, televisions (TV), tablet computers, desktop computers, mobile phones, gaming devices, and other such devices that have display capabilities.

Figure 2:
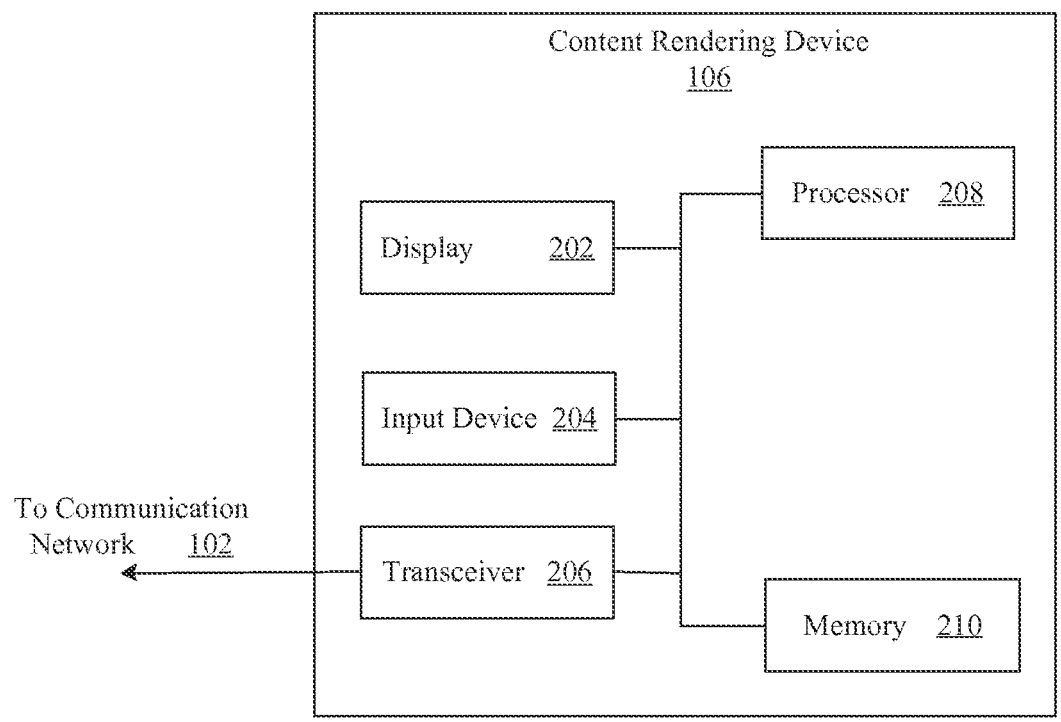
FIG. 2 is a block diagram illustrating a device, in accordance with an embodiment of the disclosure.

FIG. 2 is a block diagram illustrating devices 106. FIG. 2 is explained in conjunction with FIG. 1. The device (such as, 106a) may comprise a display 202, an input device 204, a transceiver 206, one or more processors 208 and a memory 210. The transceiver 206 may communicably couple the device (such as, 106a) to a communication network 102.

In an embodiment, the device (such as, 106a) may be communicably coupled to the server 104. The device (such as, 106a) may render audio, visual and/or audio-visual content to a user. The user may select content from a list of contents provided by the device (such as, 106a). When the device (such as, 106a) receives a request to navigate to a new content, the device (such as, 106a) may generate status information which corresponds to the previous content.

Status information may include one or more selection points. The user may create the selection points when the device (such as, 106a) is rendering content. The user may also share the selection points with other users. The selection points may be one or more of pause points, resume points, shared pause points, shared resume points, levels, and the like. The device (such as, 106a) may communicate the status information to the server 104. The device (such as, 106a) may receive a metadata which corresponds to the new content. In an embodiment, the metadata may be a Universal Resource Locator (URL), which may assist the device (such as, 106a) to access the status information and location of the new content from the server 104. The generation and communication of the status information, and receiving of metadata may occur in the background when the device (such as, 106a) switches between contents being rendered.

Figure 3:
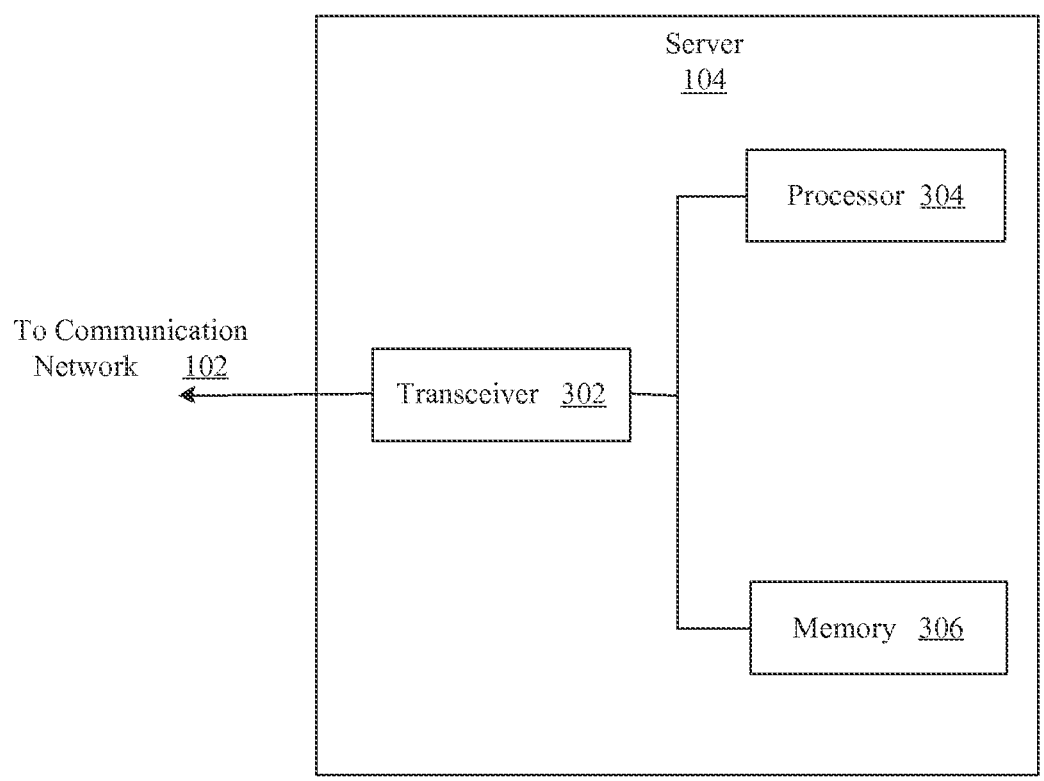
FIG. 3 is a block diagram illustrating a server connected to a network, in accordance with an embodiment of the disclosure.

FIG. 3 is a block diagram illustrating a server 104. FIG. 3 is explained in conjunction with FIG. 1. The server 104 may comprise a transceiver 302, one or more processors 304 and memory 306. The transceiver 302 may communicably couple the server 104 to communication network 102.

In an embodiment, the server 104 may be communicably coupled to the device (such as, 106a). The server 104 may receive status information from the devices (such as, 106a). The server may save the status information and generate a metadata which corresponds to the received status information. In an embodiment, the metadata may be a Universal Resource Locator (URL). The metadata may act as a pointer to the location of the content and the status information which corresponds to the content. The status information may be stored at the server 104. In an embodiment, the content may be located outside the server 104. In an embodiment, the content may be located within the server 104.

In an embodiment, the device (such as, 106a) receives a request to navigate to a content in the list of contents. The device (such as, 106a) requests the server 104 for the metadata corresponding to the content. The server 104 may communicate metadata which corresponds to the content to the device (such as, 106a). The metadata assists the device (such as, 106a) to access the content and selection points (410, 412, 414 and the like) corresponding to the content.

Figure 4A:
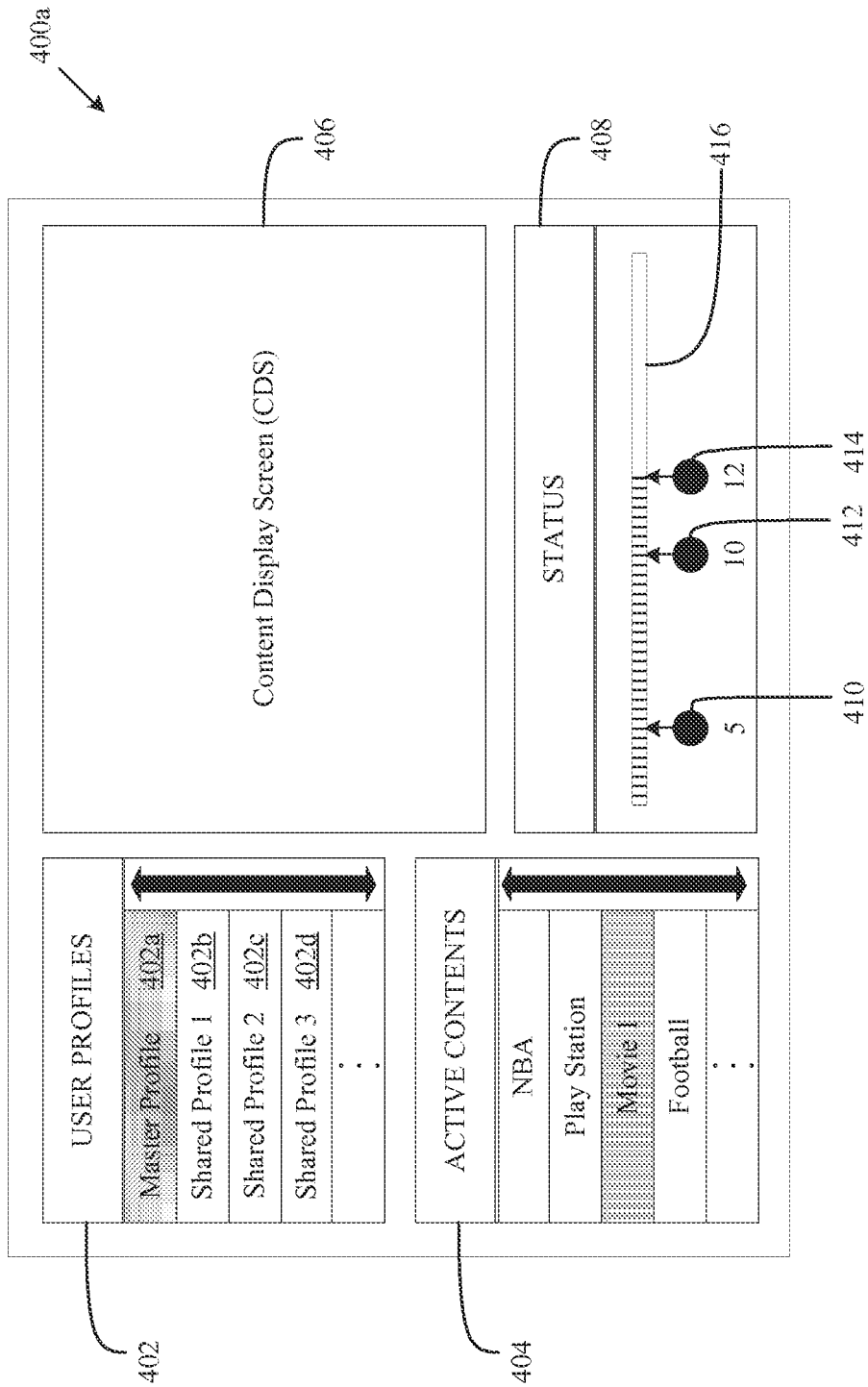
FIG. 4A and FIG. 4B are block diagrams illustrating a graphical user interface displayed at a device, in accordance with an embodiment of the disclosure.

FIG. 4A is a block diagram illustrating a graphical user interface (GUI) screen 400a, displayed at the device (such as, 106a), in accordance with an embodiment of the disclosure. In an embodiment, the GUI screen 400a may be divided into four sections, namely user profiles section 402, active contents section 404, Content Display Screen (CDS) 406 and status section 408. The user profiles section 402 may display a list of user profiles, which may include a master profile 402a and one or more shared profiles (402b, 402c, 402d, and the like). The master profile 402a may correspond to the user profile used for logging in to the device (such as, 106a). The shared profile (such as, 402b) may include one or more user profiles sharing some content with the master profile 402a.

The active contents section 404 may include lists of all the contents accessible to the selected user profile in the user profiles section 402. The list of contents may include television channels, gaming options from a video gaming console, and/or at least some audio, visual and/or audio-visual content from an interactive entertainment system connected via wired or wireless connection to the device (such as, 106a). In an embodiment, the listing of contents in the active contents section 404 may be based on master profile 402a.

In an embodiment, a user may sign into the device (such as, 106a) using a user profile registered at the server 104. The user profile used to sign in may be a master profile 402a. The user may enter the login name and login password at the device (such as, 106a). Credentials, such as login name and login password, may be verified at the server 104. After authentication of the user, the device (such as, 106a) may establish a connection with the server 104. In an embodiment, the master profile at the device (such as, 106a) may be a replica of the user profile saved at the server 104. In an embodiment, the master profile may dynamically update along with the user profile at the server 104. In an embodiment, the shared profile (such as, 402b) at the device (such as, 106a) may be a replica of the user profile saved at the server 104. In an embodiment, the shared profile may dynamically update along with the user profile at the server 104.

The status section 408 displays status information which corresponds to the selected content. The status information may be displayed as selection points (410, 412, 414, and the like) in relation with a seek bar 416. The selection points (410, 412, 414, and the like) may be pause points, resume points, shared pause points, shared resume points, and/or levels. There may be multiple selection points (410, 412, 414, and the like) associated with the seek bar 416. Pause points are selection points (410, 412, 414, and the like) that act as bookmarks for the selected content. A user may choose a selection point (such as, 410) displayed along the seek bar 416 and navigate to a particular position in the selected content which corresponds to the chosen selection point (such as, 410). The resume point navigates the user to a position in the selected content. The position may be the point from where the user navigated away from the selected content in previous session.

In an embodiment, users may share a particular content and the corresponding status information with other users. Once logged in, a user may select a shared profile (402b, for example) to view contents shared by the owner of shared profile (402b, for example). The contents shared by the owner of shared profile (402b, for example) may be displayed in the active contents section 404. The user may select a shared content from a list of contents displayed in the active contents section 404. The status section 408 may display the selection points shared by the owner of shared profile (402b, for example). The selection points (410, 412, 414, and the like) that correspond to the shared contents are shared pause points, shared resume points, shared levels, and the like.

In an embodiment, the user may have a particular content in the active contents section 404, which corresponds to both master profile 402a and one or more shared profiles (402b, 402c, 402d, and the like). When the user selects such a content which may be listed under both master profile 402a and one or more shared profiles (402b, 402c, 402d, and the like), the status section 408 may show the selection points (410, 412, 414, and the like) marked by the owners of master profile 402a and one more shared profiles (402b, 402c, 402d, and the like). In other words, the selection points (410, 412, 414, and the like) may include pause points, resume points, shared pause points, shared resume points, and the like. In an embodiment, the selection points (410, 412, 414, and the like) that correspond to different profiles (master profile and shared profiles) may be displayed in different colors. This feature helps the user to identify the selection points (410, 412, 414, and the like) created by other users.

In an embodiment, the listing of contents in the active contents section 404 may be based on the user profile associated with the master profile. The contents may be listed in a prioritized manner based on the interest and preferences identified by the user profile associated with the master profile. For example, a user may prefer movies on Friday evenings. The master profile 402a of the user has preferences and interests of the user. When the user selects a shared user profile (such as, 402b), the active contents section 404 lists contents shared with the user. The listed contents may be prioritized based on the users' preferences and interests. The active contents section 404 may list movie as first content in the list on Friday evenings. Similarly, remaining contents in the list are prioritized according to the preferences and interests of user.

In an embodiment, the display 202 of the device (such as, 106a) may be a touch screen. The user can touch the appropriate selection point (such as, 410) to resume the content from a position and/or level associated with the selection point (such as, 410). In an embodiment, the choice of selection points (410, 412, 414, and the like) may be accomplished with a touchpad, mouse, or other suitable means.

In an embodiment, the selection point (such as, 410) may be a particular level of a game, episode of a television serial, and the like from which user has to resume the content. For example, a user may be watching a television serial. User profile of the user keeps track of season and episode of the television serial watched by the user. When the user selects the same television serial from the active contents section 404, the device (such as, 106a) may start rendering the proper episode of the television serial from where the user has left the episode in a previous session. In another example, a user profile may track the extent to which user has viewed an episode of the television serial. When the user selects the television serial from the active contents section 404, the device (such as, 106a) may start rendering the television serial from the exact point where the user has left the episode in previous session.

The CDS 406 displays the selected content to the user. In an embodiment, the user can view the selected content in full screen by double clicking on the CDS 406 section, using a touchpad, mouse or other suitable means. In an embodiment, the device (such as, 106*a*) may include a touch display. The user can view the selected content in full screen by double-tapping the CDS 406 section.

Figure 4B:
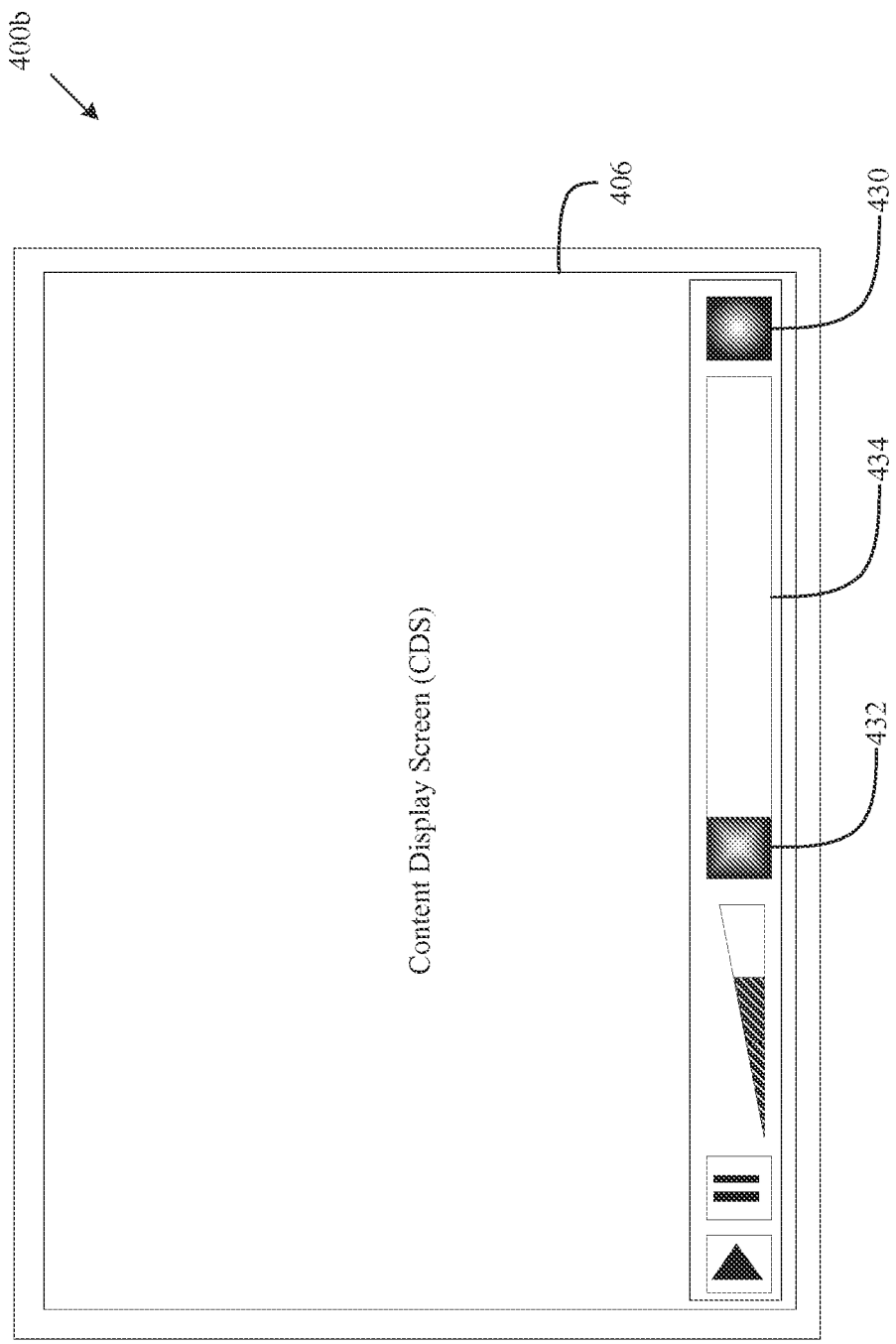

FIG. 4B is a block diagram illustrating a graphical user interface (GUI) screen 400*b*, displayed at the device (such as, 106*a*), in accordance with an embodiment of the disclosure. In an embodiment, the GUI screen 400*b* may include icons, such as create selection point 430 and share selection point 432. While content is being rendered, a user may press the create selection point 430 icon at a position of interest to generate a selection point (such as, 410) associated with the content. The user may press the share selection point 432 icon to share selection points (410, 412, 414, and the like) associated with the content. An address box 434 becomes active when the user presses the share selection point 432 icon. The user may enter a user profile in the address box 434 and press the share selection point 432 icon to share the content and selection points (410, 412, 414, and the like) associated with the content. The address box 434 may be deactivated after the sharing of content and associated selection points (410, 412, 414, and the like). The address box 434 may be activated at the first click and deactivated at the second click of the share selection point 432 icon. In an embodiment, the user may enter one or more user profiles in the address box 434. The content and associated selection points (410, 412, 414, and the like) may be shared with the user profiles entered in the address box 434. In an embodiment, the user may input a group name in the address box 434. The group name may be created by the owner of master profile 402*a* and may correspond to a list of user profiles. By entering the group name, the user may share the content and associated selection points (410, 412, 414, and the like) with multiple user profiles.

In an embodiment, a touchpad or mouse or other suitable means may be used by the user to press the icons. In an embodiment, the device (such as, 106*a*) may have a touch screen and the user may select the icons by touch input.

Figure 5A:
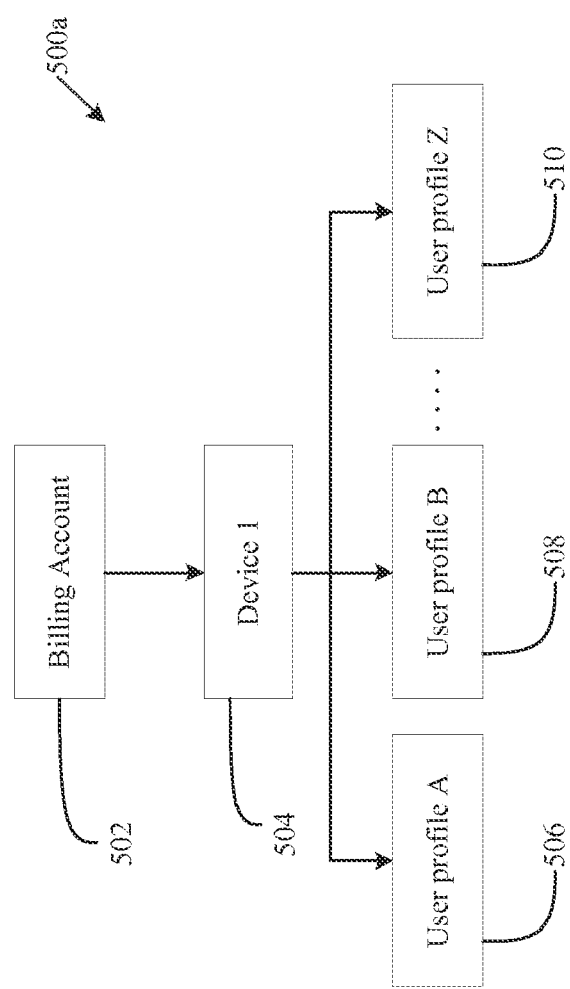
FIG. 5A and FIG. 5B are block diagrams illustrating an association of billing accounts at a server to user profiles active at devices, in accordance with an embodiment of the disclosure.
Figure 5B:
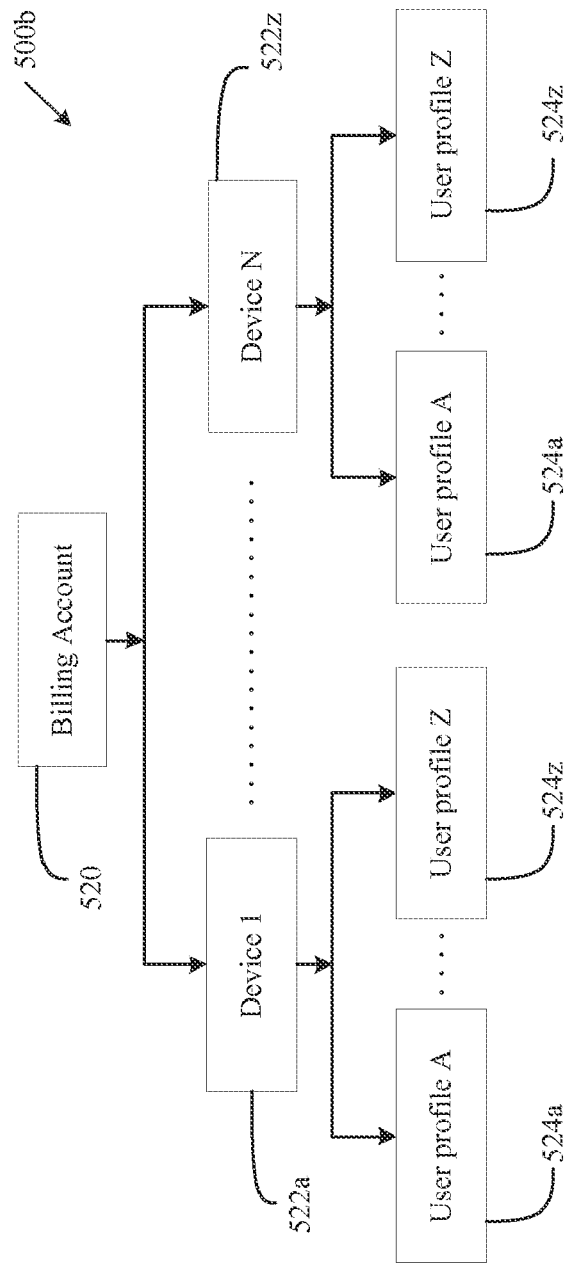

FIG. 5A and FIG. 5B are block diagrams illustrating an association of billing accounts at the server 104 to the user profiles (506, 508, 510, and the like) active at the device (such as, 106*a*). In an embodiment, the server 104 maintains a billing account that corresponds to each user profile (such as, 506). The user profile (such as, 506) used to log into the device (such as, 106*a*) may act as master profile. The billing for communication network 102 connections used or content accessed by the user may accrue in a billing account which corresponds to the user profile (such as, 506) at the server 104. In such a case, the user profile (such as, 506) corresponds to the master profile 402*a* at the device (such as, 106*a*). In an embodiment, the user profiles (524*a*, 524*z*, and the like) may be associated to multiple devices (522*a*, 522*z*, and the like). The user may access the content from different devices (522*a*, 522*z*, and the like). The server 104 can accrue the charge into a billing account corresponding to the user profile (such as, 524*a*) used to sign in to the device (such as, 522*a*).

FIG. 6 is a table 600 illustrating variations in specification of different services associated with various devices 106, in accordance with an embodiment of the disclosure. Services may include audio content, video content, web browsing, movies, and the like. The devices 106 may include laptops, televisions (TV), tablet computers, desktop computers, mobile phones, and the like. In an embodiment, the devices 106 may be registered to the server 104. Specification of each of the devices 106 may be different. The server 104 may maintain a database for the specification of all the registered devices (such as, 106). The server 104 may modify the content communicated to the device (such as, 106*a*) based on specification of the device (such as, 106*a*).

In an embodiment, the server 104 may modify a communicated content based on the communication network 102 in use to connect the device (such as, 106*a*). The rate of data transfer to the device (such as, 106*a*) may depend on the communication network 102, and hence, the quality of service. The server 104 may decide the quality of service to be provided to the device (such as, 106*a*) by identifying the capability of the communication network 102 in use. In an embodiment, the device (such as, 106*a*) may choose a communication network 102 from available multiple networks. The server 104 may modify the quality of service when the device (such as, 106*a*) changes to a new communication network (such as, 102). In an embodiment, the device (such as, 106*a*) may change to a new communication network (such as, 102) for better bandwidth. In an embodiment, the device (such as, 106*a*) may change to a new communication network (such as, 102) when the service from an existing communication network (such as, 102) is disconnected.

In an embodiment, the server 104 may communicate advertisements to the device (such as, 106*a*) based on the master profile 402*a* at the device (such as, 106*a*). The communicated advertisements may be rendered at the device (such as, 106*a*), along with the content being rendered.

In an embodiment, the server 104 may communicate advertisements to the device (such as, 106*a*), based on a shared profile (402*b*, for example) at the device (such as, 106*a*). In an embodiment, the server 104 may communicate advertisements to the device (such as, 106*a*) based on the master profile 402*a* and one or more shared profiles (402*b*, 402*c*, 402*d*, and the like) at the device (such as, 106*a*). In an embodiment, the position of the advertisement within the content may be communicated to the device (such as, 106*a*) from the server 104.

In an embodiment, the server 104 may communicate advertisements to the device (such as, 106*a*), based on the master profile 402*a* at the device (such as, 106*a*) and features of the device (such as, 106*a*). For example, an interactive advertisement may be rendered at the device (such as, 106*a*), between content being rendered. The device (such as, 106*a*) may have touch screen or remote or other suitable input mechanisms/gadgets. User of the device (such as, 106*a*) may opt for discounts or coupons provided in the interactive advertisement. The device may navigate the user to a website corresponding to the interactive advertisement. Once the user completes the purchase, the device (such as, 106*a*) may navigate back to the content, or another advertisement, communicated by the server 104.

In an embodiment, the device (such as, 106*a*) may receive a request to navigate from the content being rendered to a user interface, such as a menu or TV guide. The device (such as, 106*a*) may navigate to such a user interface without terminating the rendering content. The requested user interface may be shown as a transparent overlay along with the rendering content. When the device (such as, 106*a*) receives a request to navigate to such a user interface, the device (such as, 106*a*) may generate status information corresponding to the content being rendered. In an embodiment, the device (such as, 106*a*) may generate the status information corresponding to the first content being rendered when the device receives a request to navigate to the second content, where the first content may continue to be rendered after navigation to the second content. The generated status information may be communicated to the server 104 for rendering the content at a later time. In an embodiment, when the device (such as, 106*a*) receives a request to navigate to such a user interface, the device (such as, 106*a*) may render the content in a picture in picture format, for example. The user may select a new content from the menu, when the device (such as, 106a) may be rendering the content as a picture in picture format or as an overlay over the content being rendered. When the user selects the new content from the menu, the new content may be rendered in a picture in picture format or as an overlay along with the content being rendered. This feature provides the user to inspect various aspects, such as video quality and/or audio quality, of the new content before leaving the content being rendered. In an embodiment, the device (such as, 106a) may generate and communicate status information corresponding to the content being rendered, when the device (such as, 106a) receives a request to turn off the device. In an embodiment, actions, such as pausing, resuming, sharing, rewinding and/or re-playing, performed by the user on the first content may trigger generation and communication of status information. For example, status information may be generated that corresponds to the first content being rendered when the device navigates the first content by rewinding a previous point of the first content being rendered. Notwithstanding, the disclosure may not be so limited and the status information may be generated for various actions associated with navigation of the first content without limiting the scope of the disclosure.

In an embodiment, the user may select a new content and place it in buffering mode. In buffering mode, the device (such as, 106a) may buffer the new content and save it in memory 210. The new content may be rendered when the device (such as, 106a) receives a request for rendering the new content or when the content being rendered is completed. The request for rendering new content may trigger generation and communication of status information corresponding to the content being rendered. Alternately, status information may be generated and communicated to the server 104 when the content being rendered is terminated. In an embodiment, the memory allocated for buffering the new content may be limited. Once the memory limit is reached, the device (such as, 106a) may continue buffering the new content after it starts rendering the new content.

Figure 7:
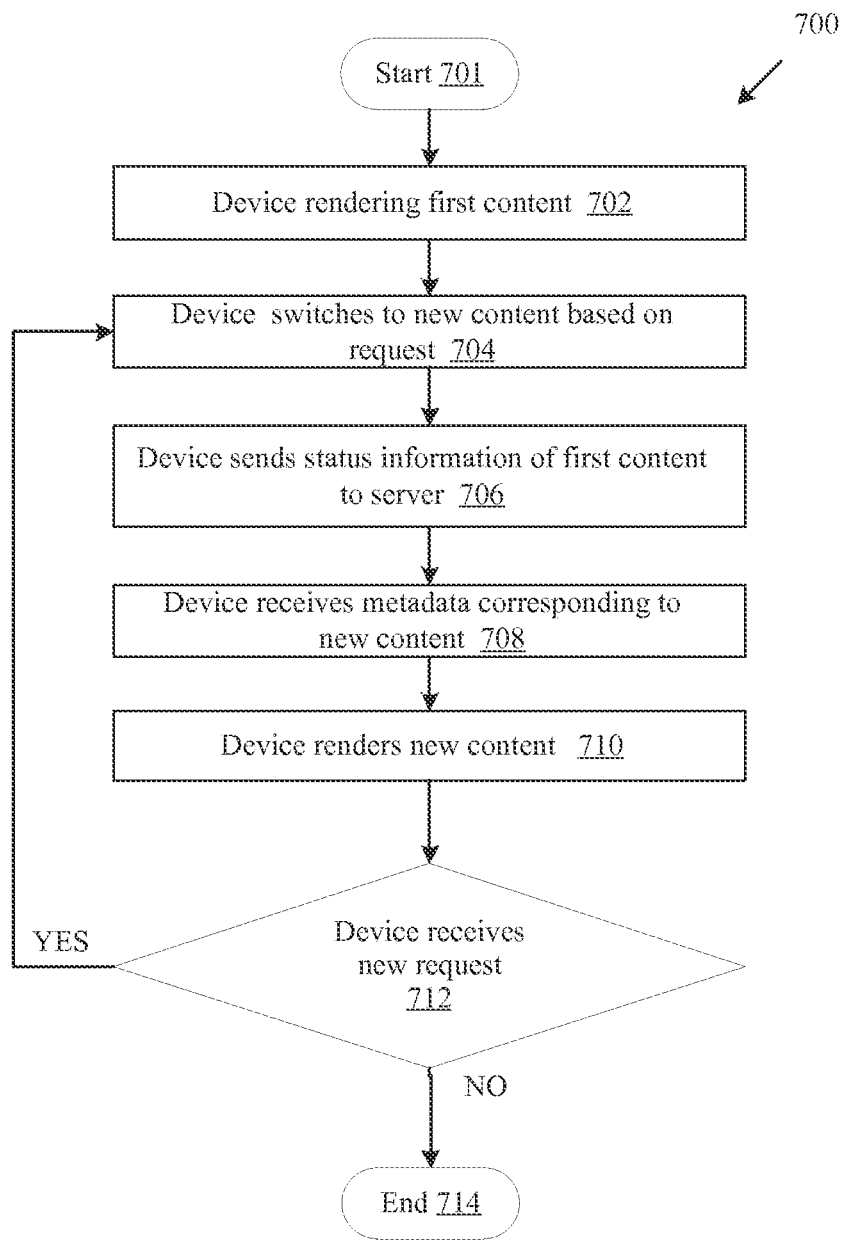
FIG. 7 is a flow chart illustrating a method of rendering content at a device, in accordance with an embodiment of the disclosure.

FIG. 7 is a flow chart illustrating a method 700 of rendering content at a device, in accordance with an embodiment of the disclosure. FIG. 7 is explained in conjunction with FIG. 1. With reference to FIG. 7, exemplary steps may begin at step 701. At step 702, the device (such as, 106a) may render a first content. At step 704, the device (such as, 106a) receives and acts on a request to switch to new content. At step 706, the device (such as, 106a) sends status information related to the first content to the server 104. At step 708, the device (such as, 106a) receives metadata which corresponds to the new content from the server 104. At step 710, the device (such as, 106a) renders the new content. At step 712, if the device (such as, 106a) receives a new request to navigate to different content, the method then continues with step 704. At step 712, if the device (such as, 106a) does not receive a new request to navigate to different content, control then passes to end step 714.

Figure 8:
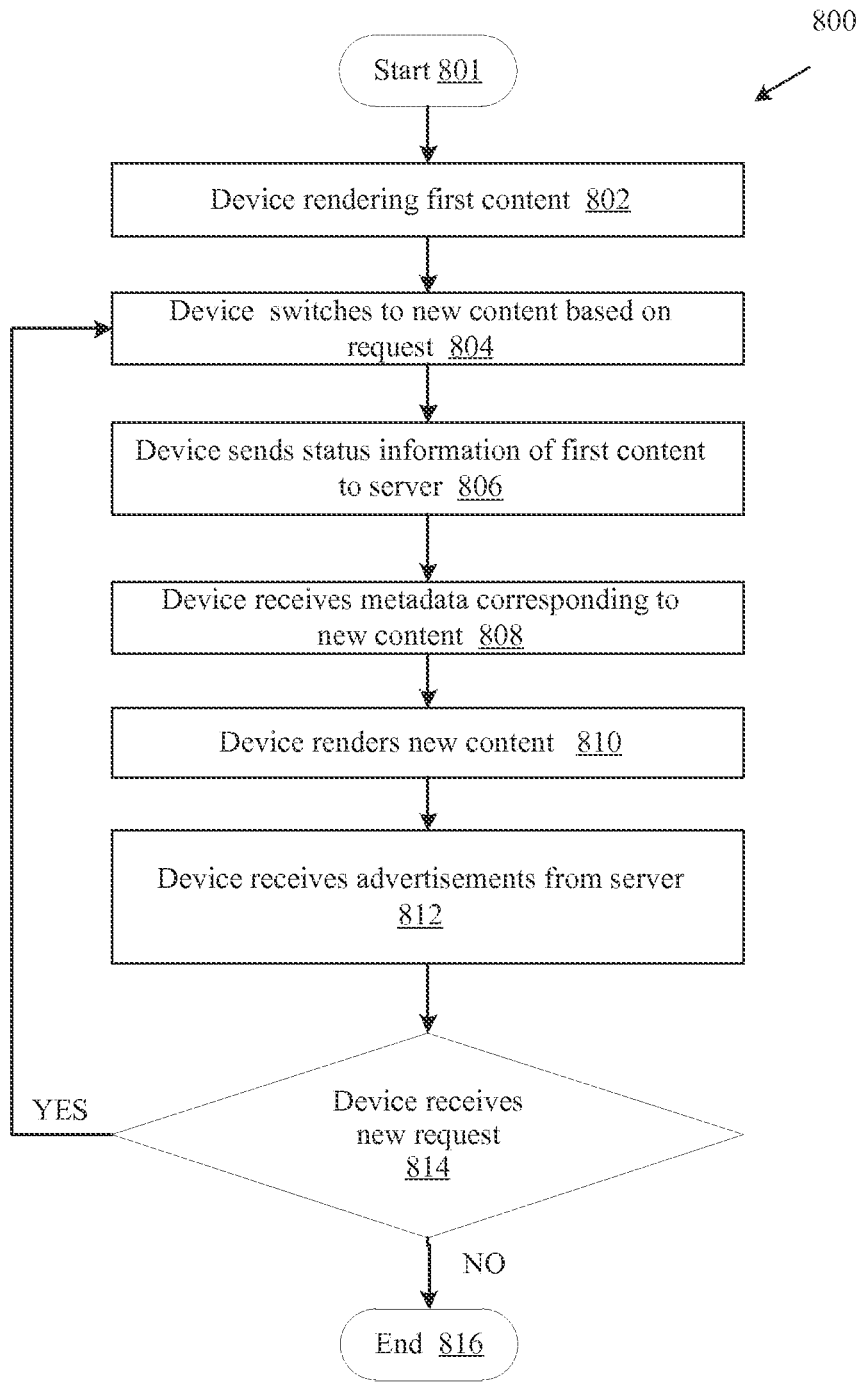
FIG. 8 is a flow chart illustrating a method of rendering advertisements at a device, in accordance with an embodiment of the disclosure.

FIG. 8 is a flow chart illustrating a method 800 of rendering advertisements at a device, in accordance with an embodiment of the disclosure. FIG. 8 is explained in conjunction with FIG. 1. With reference to FIG. 8, exemplary steps may begin at step 801. At step 802, the device (such as, 106a) may render a first content. At step 804, the device (such as, 106a) receives and acts on a request to switch to new content. At step 806, the device (such as, 106a) sends status information of the first content to the server 104. At step 808, the device (such as, 106a) receives metadata which corresponds to the new content from the server 104. At step 810, the device (such as, 106a) renders the new content. At step 812, the device (such as, 106a) may receive advertisements from the server 104. At step 814, if the device (such as, 106a) receives a new request to navigate to different content, the method continues with step 804. At step 814, if the device (such as, 106a) does not receive a new request to navigate to different content, control then passes to end step 816.

Figure 9:
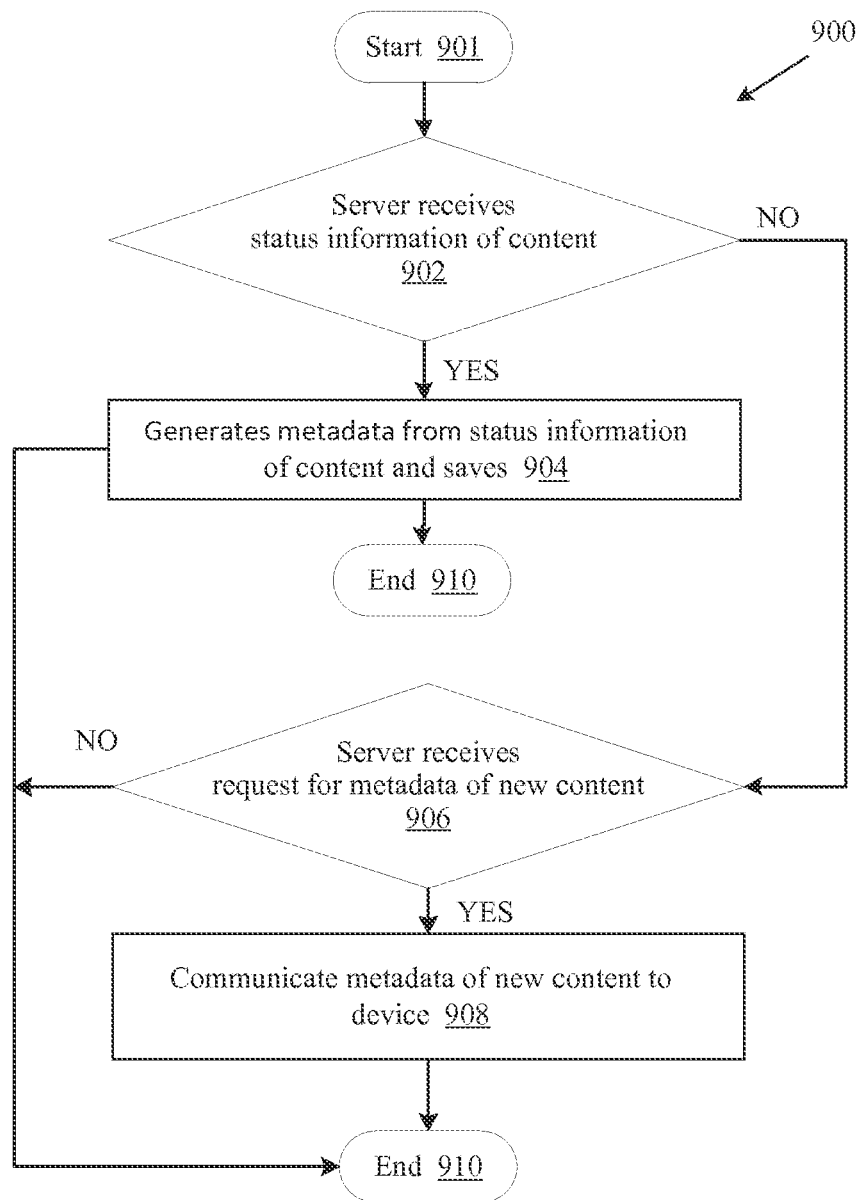
FIG. 9 is a flow chart illustrating a method of providing metadata by a server, in accordance with an embodiment of the disclosure.

FIG. 9 is a flow chart illustrating a method 900 of providing metadata by a server, in accordance with an embodiment of the disclosure. FIG. 9 is explained in conjunction with FIG. 1. With reference to FIG. 9, exemplary steps may begin at step 901. At step 902, if the server 104 receives status information of content from the device (such as, 106a), the method proceeds to step 904. At step 904, the server 104 generates metadata from the status information and saves the metadata in server 104 and the method 900 ends. At step 902, if the information received by the server 104 is not status information of content, then the method proceeds to step 906. At step 906, if a server 104 receives a request for metadata of new content from the device (such as, 106a), the method proceeds to step 908. At step 908, the server 104 may communicate metadata of new content to the device (such as, 106a) and the method 900 ends. The method continues with step 902. At step 906, if the information received by the server 104 from the device (such as, 106a) is not a request for metadata of new content, control then passes to end step 910.

In accordance with an embodiment of the disclosure, a method and system for seamless navigation of content across different devices may comprise one or more devices 106 for rendering content communicably connected to one or more servers (such as, 104).

Described embodiments of the disclosure may be found in a system and/or method for rendering content in a device (such as, 106a) communicably coupled to a server 104. Exemplary aspects of the disclosure may comprise one or more processors and/or circuits in the device (such as, 106a). The device (such as, 106a) generates status information which corresponds to a first content being rendered when the device (such as, 106a) navigates from the first content and/or to a second content. The device (such as, 106a) communicates the generated status information to the server 104. The device (such as, 106a) renders a second content based on a metadata associated with status information of the second content. In an embodiment, the device (such as, 106a) may generate the status information corresponding to the first content being rendered when the device receives a request to navigate away from the first content. In an embodiment, the device (such as, 106a) may receive metadata from the server 104 when the device (such as, 106a) receives a request to navigate to the second content. In an embodiment, the navigation from the first content may be one of navigating to a menu or turning off the device. In an embodiment, the device (such as, 106a) may generate the status information corresponding to the first content being rendered when the device receives a request to navigate to the second content, where the second content may be rendered as a partially transparent overlay along with the first content being rendered. In an embodiment, the first content or the second content may be rendered as a picture in picture format. In an embodiment, the first content and the second content may be same.

The metadata may comprise a Uniform Resource Locator (URL). The first content and the second content may be stored in the server 104. The status information comprises one or more of pause points, resume points, shared pause points, shared resume points, levels in a game, episodes in a serial, user performed actions (such as rewinding a portion of the first content, re-playing a portion of the first content) and the like. The device (such as, 106a) is associated with one or more user profiles which correspond to one or more users interacting with the device (such as, 106a). The device (such as, 106a) is associated with one or more user profiles which correspond to one or more users interacting with the device (such as, 106a). The one or more processors and/or circuits are operable to render a prioritized list of plurality of content based on the one or more user profiles. The one or more processors and/or circuits are operable to render one or more advertisements along with the first content and/or the second content based on the one or more user profiles. The one or more processors and/or circuits are operable to render the first content and/or the second content in accordance with one or more predefined parameters associated with the device (such as, 106a) and/or a communication network 102 associated with the device (such as, 106a). The one or more predefined parameters for the device (such as, 106a) comprises one or more of one or more file formats that the device is capable of rendering, one or more codecs that the device is capable of rendering, aspect ratio, two dimensional (2D) display, three dimensional (3D) display, touch screen display, and/or 3D sensors. The one or more predefined parameters for the communication network 102 comprise one or both of bandwidth and/or connectivity. The one or more file formats may include file formats for text, audio, image and/or audio-visual content, such as 3GPP file format, Extensible Music Format. The one or more codecs may include codecs for text, audio, image and/or audiovisual content, such as MPEG-4 Scalable to Lossless Coding, MPEG-4 Audio Lossless Coding, H.264 Advanced Video Coding.

Described embodiments of the disclosure may be found in a system and/or method for rendering content in a device (such as, 106a). Exemplary aspects of the disclosure may comprise one or more processors and/or circuits in a server 104 communicably coupled to a plurality of devices 106. The one or more processors and/or circuits are operable to generate a metadata associated with content from status information, wherein the status information is received from a first device (such as, 106a) of the plurality of devices 106 when the first device (such as, 106a) navigates content. The one or more processors and/or circuits are operable to communicate the metadata to a second device (such as, 106a) of the plurality of devices 106, wherein the content is rendered at one or more devices (such as, 106a) based on the metadata. In an embodiment, the one or more processors and/or circuits are operable to generate the metadata associated with the content based on the received status information corresponding to the content, wherein the status information is received from the first device of the plurality of devices when the first device receives a request to navigate away from the content. In an embodiment, the one or more processors and/or circuits are operable to communicate the metadata to the second device (such as, 106a) when the second device (such as, 106a) receives a request to navigate to the content. In an embodiment, the navigation of the content comprises one or more of pausing, resuming, sharing, rewinding and/or re-playing a portion of the first content. In certain other embodiments of the disclosure the first device (such as, 106a) and the second device (such as, 106a) are same.

Described embodiments of the disclosure may be found in a system and/or method in a network comprising one or more devices 106 coupled to one or more servers (such as, a server 104). Exemplary aspects of the disclosure may comprise a first processor in at least one of the one or more devices 106. The first processor is operable to generate status information which corresponds to a first content being rendered when a device associated to the first processor navigates the first content. The first processor is operable to communicate the generated status information to the one or more servers (such as, 104).

Exemplary aspects of the disclosure may comprise a second processor in a server (such as, 104). The second processor is operable to generate a metadata based on the received status information associated with the first content. The second processor is operable to communicate metadata to at least one of the one or more devices 106, wherein the metadata is used to render the first content at the at least one of the one or more devices. In an embodiment, the first processor is operable to communicate the first metadata to the at least one of the one or more devices 106 when the at least one of the one or more devices 106 receives another request to navigate to the first content. In an embodiment, the first processor is operable to communicate the first metadata to the at least one of the one or more devices 106 when the at least one of the one or more devices 106 receives another request to navigate to the first content.

The first processor is operable to render the second content based on a received metadata associated with status information of the second content, where the metadata is received from the server when the device receives a request to navigate from the first content to the second content. In accordance with another embodiment, the first content continues to be rendered after navigation to the second content.

The second processor is operable to generate a metadata associated with the second content based on status information associated with the second content, and communicate the metadata associated with the second content to at least one of the one or more devices when the one of the one or more devices receives a request to navigate to the second content.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer for rendering content in a device communicably coupled to a server, thereby causing the machine and/or computer to perform the steps comprising generating status information which corresponds to a first content being rendered when the device receives a request to navigate away from the first content, communicating the generated status information to the server and rendering a second content based on a metadata associated with status information of the second content, and wherein the metadata is received from the server when the device receives a request to navigate to the second content.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer for rendering content in a device communicably coupled to a server, thereby causing the machine and/or computer to perform the steps comprising generating a metadata associated with content based on a received status information, wherein the status information is received from a first device of the plurality of devices when the first device receives a request to navigate away from the content and communicating the metadata to a second device of the plurality of devices, when the second device receives a request to navigate to the content.

The present disclosure may be realized in hardware, or a combination of hardware and software. The present disclosure may be realized in a centralized fashion in at least one computer system or in a distributed fashion where different elements may be spread across several interconnected computer systems. A computer system or other apparatus adapted for carrying out the methods described herein may be suited. A combination of hardware and software may be a general-purpose computer system with a computer program that, when being loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program in the present context means expressions, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A device for rendering content, said device comprising:
one or more processors and/or circuits in said device communicably coupled to a server, wherein said one or more processors and/or circuits are operable to:
generate status information corresponding to first content being rendered based on said device navigating from said first content to second content;
communicate said generated status information to said server; and
render said second content based on metadata associated with status information of said second content,
wherein, in an event said device navigates to said first content from said second content, based on said generated status information corresponding to said first content, said device renders said first content.

2. The device of claim 1, wherein said one or more processors and/or circuits are operable to generate said status information corresponding to said first content being rendered when said device receives a request to navigate away from said first content to said second content.

3. The device of claim 1, wherein said one or more processors and/or circuits are operable to receive said metadata from said server when said device receives a request to navigate to said second content.

4. The device of claim 1, wherein said navigating from said first content comprises one of: navigating to a menu or turning off said device.

5. The device of claim 1, wherein said one or more processors and/or circuits are operable to generate said status information corresponding to said first content being rendered when said device receives a request to navigate to said second content, wherein said first content continues to be rendered after said navigation to said second content.

6. The device of claim 1, wherein said first content or said second content is rendered in a picture in picture format.

7. The device of claim 1, wherein said second content is same as said first content.

8. The device of claim 1, wherein said metadata comprises a Uniform Resource Locator (URL).

9. The device of claim 1, wherein said status information corresponding to said first content comprises one or more of: pause points, resume points, shared pause points, shared resume points, levels in a game, episodes in a serial and/or user performed actions, such as rewinding a portion of said first content, or re-playing a portion of said first content.

10. The device of claim 1, wherein said device is associated with one or more user profiles corresponding to one or more users interacting with said device.

11. The device of claim 10, wherein said one or more processors and/or circuits are operable to render a prioritized list of a plurality of content based on said one or more user profiles.

12. The device of claim 10, wherein said one or more processors and/or circuits are operable to render one or more advertisements along with said first content and/or said second content based on said one or more user profiles.

13. The device of claim 1, wherein said one or more processors and/or circuits are operable to render said first content and/or said second content in accordance with one or more predefined parameters associated with said device and/or a communication network associated with said device.

14. The device of claim 13, wherein said one or more predefined parameters for said device comprise one or more of: one or more file formats that said device is capable of rendering, one or more codecs that said device is capable of rendering, aspect ratio, two-dimensional (2D) display, three-dimensional (3D) display, touch screen display, and/or 3D sensors.

15. The device of claim 13, wherein said one or more predefined parameters for said communication network comprise one or both of: bandwidth and/or connectivity.

16. A method for rendering content, said method comprising:
in a device communicably coupled to a server:
generating status information corresponding to first content being rendered based on said device navigating from said first content to second content;
communicating said generated status information to said server; and
rendering said second content based on metadata associated with status information of said second content,
wherein, in an event said device navigates to said first content from said second content, based on said generated status information corresponding to said first content, rendering said first content.

17. The method of claim 16, comprising generating said status information corresponding to said first content being rendered when said device receives a request to navigate away from said first content to said second content.

18. The method of claim 16, comprising receiving said metadata from said server when said device receives a request to navigate to said second content.

19. The method of claim 16, wherein said navigation from said first content is one of: navigating to a menu or turning off said device.

20. The method of claim 16, comprising generating said status information corresponding to said first content being rendered when said device receives a request to navigate to said second content, wherein said second content is rendered as an overlay over said first content being rendered.

21. The method of claim 16, wherein said first content or said second content is rendered in a picture in picture format.

22. The method of claim 16, wherein said second content is same as said first content.

23. The method of claim 16, wherein said metadata comprises a Uniform Resource Locator (URL).

24. The method of claim 16, wherein said status information comprises one or more of: pause points, resume points, shared pause points, shared resume points, levels in a game, episodes in a serial and/or user performed actions, such as rewinding a portion of said first content, or re-playing a portion of said first content.

25. The method of claim 16, wherein said device is associated with one or more user profiles.

26. The method of claim 25, wherein said one or more user profiles comprise one or more of: user's interest, user's emotion and/or user's location.

27. The method of claim 26, comprising rendering a prioritized list of a plurality of content based on said one or more user profiles.

28. The method of claim 26, comprising rendering advertisements along with said first content and/or said second content based on said one or more user profiles.

29. The method of claim 16, wherein said first content and/or said second content comprises live content, pre-stored content and/or a combination of both live content and pre-stored content.

30. The method of claim 16, comprising rendering said first content and/or said second content in accordance with predefined parameters associated with said device and/or a communication network associated with said device.

31. The method of claim 30, wherein said one or more predefined parameters for said device comprises one or more of: one or more file formats that said device is capable of rendering, one or more codecs that said device is capable of rendering, aspect ratio, two-dimensional (2D) display, three-dimensional (3D) display, touch screen display, and/or 3D sensors.

32. The method of claim 30, wherein said one or more predefined parameters for said communication network comprise one or both of: bandwidth and/or connectivity.

33. A system comprising:
in a network comprising one or more devices coupled to a server, wherein at least one of said one or more devices comprises:
a first processor operable to:
generate first status information corresponding to first content being rendered based on said at least one of said one or more devices navigating said first content;
communicate said generated first status information to said server; and
wherein said server comprises:
a second processor operable to:
generate a first metadata based on said first status information associated with said first content; and
communicate said first metadata to at least one of other of said one or more devices, wherein said first content is rendered on said at least one of other of said one or more devices based on said first metadata.

34. The system of claim 33, wherein said first processor is operable to generate said first status information corresponding to said first content when said at least one of said one or more devices associated with said first processor receives a request to navigate said first content on said at least one of other of said one or more devices.

35. The system of claim 33, wherein said first processor is operable to communicate said first metadata to said at least one of other of said one or more devices when said at least one of said one or more devices receives another request to navigate away from said first content.

36. The system of claim 33, wherein said first processor is operable to render a second content based on a received second metadata associated with second status information of said second content, and wherein said received second metadata is received from said server when said at least one of said one or more devices receives a request to navigate from said first content to said second content.

37. The system of claim 33, wherein said second processor is operable to:
generate a second metadata associated with second content based on second status information associated with said second content; and
communicate said second metadata associated with said second content to said at least one of said one or more devices when said at least one of said one or more devices receives a request to navigate from said first content to said second content.

38. A server in a network, said server comprising:
one or more processors and/or circuits communicatively coupled to a plurality of devices, wherein said one or more processors and/or circuits are operable to:
generate metadata associated with first content based on received status information corresponding to said first content, wherein said status information is received from a device of said plurality of devices based on said device navigating from said first content to second content; and
communicate said metadata to said device of said plurality of devices, wherein, in an event said device of said plurality of devices navigates to said first content from said second content, based on said generated status information corresponding to said first content, said device renders said first content.

39. The server of claim 38, wherein said one or more processors and/or circuits are operable to generate said metadata associated with said first content based on said received status information corresponding to said first content, wherein said status information is received from said device of said plurality of devices when said device receives a request to navigate from said first content.

40. The server of claim 38, wherein said one or more processors and/or circuits are operable to communicate said metadata to said device when said device receives a request to navigate to said second content.

41. The server of claim 38, wherein said navigation of said first content comprises one or more of: pausing, resuming, sharing, rewinding and/or re-playing a portion of said first content.

42. The server of claim 38, wherein said first content continues to be rendered after said navigation to said second content.

* * * * *